(12) United States Patent
Patel et al.

(10) Patent No.: US 11,256,446 B1
(45) Date of Patent: Feb. 22, 2022

(54) HOST BUS ADAPTOR (HBA) VIRTUALIZATION AWARE MULTI-PATHING FAILOVER POLICY

(71) Applicant: EMC IP Holding Company LLC, Hopkinton, MA (US)

(72) Inventors: Rimpesh Patel, Bangalore (IN); Amit Pundalik Anchi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/983,050

(22) Filed: Aug. 3, 2020

(51) Int. Cl.
*G06F 12/00* (2006.01)
*G06F 13/00* (2006.01)
*G06F 3/06* (2006.01)

(52) U.S. Cl.
CPC ............ *G06F 3/0664* (2013.01); *G06F 3/067* (2013.01); *G06F 3/0611* (2013.01); *G06F 3/0631* (2013.01); *G06F 3/0635* (2013.01); *G06F 3/0653* (2013.01); *G06F 3/0659* (2013.01)

(58) Field of Classification Search
CPC .... G06F 3/0664; G06F 3/0611; G06F 3/0631; G06F 3/0635; G06F 3/0653; G06F 3/0659; G06F 3/067
USPC ........................................................ 711/154
See application file for complete search history.

(56) References Cited

U.S. PATENT DOCUMENTS

| 6,567,397 | B1 | 5/2003 | Campana et al. |
| 6,687,746 | B1 | 2/2004 | Shuster et al. |
| 6,697,875 | B1 | 2/2004 | Wilson |
| 7,275,103 | B1 | 9/2007 | Thrasher et al. |
| 7,454,437 | B1 | 11/2008 | Lavallee et al. |

(Continued)

FOREIGN PATENT DOCUMENTS

| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Sheng Jen Tsai
(74) *Attorney, Agent, or Firm* — Ryan, Mason & Lewis, LLP

(57) ABSTRACT

A host device is configured to communicate over a network with a storage system comprising a plurality of storage devices. The host device comprises a multi-path input-output (MPIO) driver configured to control delivery of input-output (IO) operations from the host device to the storage system over a plurality of paths through the network. The MPIO driver is further configured to identify whether given ones of a plurality of initiators associated with the paths comprise given ones of a plurality of virtual initiator instances, and to identify given ones of a plurality of physical initiator components corresponding to the given ones of the virtual initiator instances. The MPIO driver is also configured to detect a failure of an IO operation over a first path, and to select a second path for retrying the IO operation based on the identification of the physical initiator components corresponding to the virtual initiator instances.

20 Claims, 4 Drawing Sheets

(56) References Cited

U.S. PATENT DOCUMENTS

| | | | |
|---|---|---|---|
| 7,617,292 B2 | 11/2009 | Moore et al. | |
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,719,817 B2* | 5/2014 | Aswani | G06F 9/45558 718/1 |
| 8,825,919 B1 | 9/2014 | Lim et al. | |
| 8,832,334 B2 | 9/2014 | Okita | |
| 8,874,746 B1 | 10/2014 | Gonzalez | |
| 8,959,288 B1* | 2/2015 | de la Iglesia | G06F 12/0802 711/133 |
| 9,026,694 B1 | 5/2015 | Davidson et al. | |
| 9,201,803 B1 | 12/2015 | Derbeko et al. | |
| 9,400,611 B1 | 7/2016 | Raizen | |
| 9,430,368 B1 | 8/2016 | Derbeko et al. | |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1* | 11/2019 | Rao | H04L 67/1097 |
| 10,521,369 B1* | 12/2019 | Mallick | H04L 67/1097 |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 11,023,134 B1* | 6/2021 | Rao | G06F 3/0685 |
| 11,032,373 B1* | 6/2021 | Mallick | H04L 67/322 |
| 2002/0023151 A1 | 2/2002 | Iwatani | |
| 2002/0103923 A1 | 8/2002 | Cherian et al. | |
| 2004/0010563 A1 | 1/2004 | Forte et al. | |
| 2006/0026346 A1 | 2/2006 | Kadoiri et al. | |
| 2006/0277383 A1 | 12/2006 | Hayden et al. | |
| 2007/0174849 A1 | 7/2007 | Cheung et al. | |
| 2008/0043973 A1 | 2/2008 | Lai et al. | |
| 2008/0201458 A1 | 8/2008 | Salil | |
| 2008/0301332 A1 | 12/2008 | Butler et al. | |
| 2009/0259749 A1 | 10/2009 | Barrett et al. | |
| 2010/0313063 A1 | 12/2010 | Venkataraja et al. | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2012/0246345 A1 | 9/2012 | Contreras et al. | |
| 2013/0117766 A1 | 5/2013 | Bax et al. | |
| 2013/0339551 A1 | 12/2013 | Flanagan et al. | |
| 2014/0105068 A1 | 4/2014 | Xu | |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2017/0235507 A1 | 8/2017 | Sinha et al. | |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0095299 A1 | 3/2019 | Liu et al. | |
| 2019/0108888 A1 | 4/2019 | Sarkar et al. | |
| 2019/0334987 A1 | 10/2019 | Mallick et al. | |
| 2020/0021654 A1* | 1/2020 | Rao | H04L 67/1097 |
| 2020/0097203 A1* | 3/2020 | Mallick | G06F 3/0634 |
| 2020/0106698 A1* | 4/2020 | Rao | H04L 45/24 |
| 2020/0110552 A1* | 4/2020 | Kumar | G06F 16/214 |
| 2020/0112608 A1* | 4/2020 | Patel | H04L 67/1008 |
| 2020/0133497 A1* | 4/2020 | Meiri | G06F 3/0644 |
| 2020/0204475 A1* | 6/2020 | Mallick | H04L 45/24 |
| 2020/0204495 A1* | 6/2020 | Mallick | G06F 3/061 |
| 2020/0213274 A1 | 7/2020 | Pusalkar et al. | |
| 2020/0226145 A1* | 7/2020 | Meiri | G06F 3/067 |
| 2020/0349094 A1* | 11/2020 | Smith | G06F 11/3034 |
| 2020/0372401 A1* | 11/2020 | Mallick | G06N 20/00 |
| 2021/0019054 A1* | 1/2021 | Anchi | G06F 3/065 |
| 2021/0099520 A1* | 4/2021 | Anchi | G06F 13/102 |
| 2021/0099521 A1* | 4/2021 | Sethuraman | H04L 41/069 |
| 2021/0109658 A1* | 4/2021 | Mallick | G06F 3/0635 |
| 2021/0157502 A1* | 5/2021 | Rao | G06F 3/0664 |
| 2021/0157509 A1* | 5/2021 | Anchi | G06F 3/0604 |
| 2021/0181947 A1* | 6/2021 | Patel | G06F 3/061 |
| 2021/0181965 A1* | 6/2021 | Anchi | G06F 3/061 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

VMware, Inc. "Configure Fibre Channel NPIV Settings," https://docs.vmware.com/en/VMware-vSphere/7.0/com.vmware.vsphere.vm_admin.doc/GUID-74DDA7F7-84AC-4251-8749-552A2678A33C.html, May 31, 2019, 2 pages.

PC MAG Encyclopedia, "Virtual Machine," https://www.pcmag.com/encyclopedia/term/virtual-machine, Accessed Jul. 13, 2020, 5 pages.

Wikipedia, "Logical Partition," https://en.wikipedia.org/w/index.php?title=Logical_partition&oldid=951198579, Apr. 16, 2020, 4 pages.

PC MAG Encyclopedia, "LPAR," https://www.pcmag.com/encyclopedia/term/lpar, Accessed Jul. 13, 2020, 3 pages.

Wikipedia, "Hypervisor," https://en.wikipedia.org/w/index.php?title=Hypervisor&oldid=966991148, Jul. 10, 2020, 7 pages.

IBM Support, "Virtual I/O Server Overview," https://www.ibm.com/support/knowledgecenter/9009-42A/p9hb1/p9hb1_vios_virtualioserveroverview.htm, Accessed Jul. 16, 2020, 3 pages.

Veritas Storage Foundation, "Intorduction to AIX Logical Partition (LPAR) Virtualization Technology," https://sort.veritas.com/public/documents/sfha/6.0.1/aix/productguides/html/sfhas_virtualization/ch01_s01.htm, Accessed Jul. 13, 2020, 2 pages.

quora.com, "What's the Difference between an LPAR and a Virtual Machine?" https://www.quora.com/Whats-the-difference-between-an-LPAR-and-a-Virtual-Machine, Accessed Jul. 13, 2020, 3 pages.

U.S. Appl. No. 16/697,393 filed in the name of Vinay G. Rao et al. filed Nov. 27, 2019, and entitled "Automated Seamless Migration of Logical Storage Devices.".

(56) References Cited

OTHER PUBLICATIONS

U.S. Appl. No. 16/710,828 filed in the name of Amit Pundalik Anchi et al. filed Dec. 11, 2019, and entitled "Automated Seamless Migration with Signature Issue Resolution.".

* cited by examiner

HOST BUS ADAPTOR (HBA) VIRTUALIZATION AWARE MULTI-PATHING FAILOVER POLICY

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery to storage ports of the storage system. The storage ports are typically limited in number and each has limited resources for handling IO operations received from the host devices. Different ones of the host devices can run different applications with varying workloads and associated IO patterns. Such host devices also generate additional IO operations in performing various data services such as replication and migration so as to meet business continuity requirements.

Conventional host device multi-pathing arrangements in some situations implement various failure policies to route failed application IO operations to available paths through various host bus adaptor (HBA) ports. However, with conventional techniques, the failure policies are not aware of and not aligned with HBA virtualization arrangements. Such deficiencies could potentially lead to the selection of non-optimal paths in the event of failure of one or more IO operations, resulting in less-effective multi-pathing policies.

SUMMARY

Illustrative embodiments identify details of one or more virtual HBAs and their respective backing physical HBAs in order to provide failure policies that implement HBA virtualization aware multi-pathing decisions that are aligned with HBA virtualization arrangements. The embodiments advantageously add a new dimension to multi-path decision making by considering path hierarchical details of HBA virtualization configurations when selecting paths in the event of a failure of one or more IO operations.

In one embodiment, an apparatus comprises a host device configured to communicate over a network with a storage system. The host device comprises an MPIO driver configured to control delivery of IO operations from the host device to the storage system over selected ones of a plurality of paths through the network. The MPIO driver of the host device is further configured to identify whether given ones of a plurality of initiators associated with the plurality of paths comprise given ones of a plurality of virtual initiator instances, and to identify given ones of a plurality of physical initiator components corresponding to the given ones of the plurality of virtual initiator instances. The MPIO driver is also configured to detect a failure of at least one IO operation of the plurality of input-output operations over a first path of the plurality of paths, and to select a second path of the plurality of paths for retrying the at least one IO operation. The selection of the second path is based at least in part on the identification of the given ones of the plurality of physical initiator components corresponding to the given ones of the plurality of virtual initiator instances.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
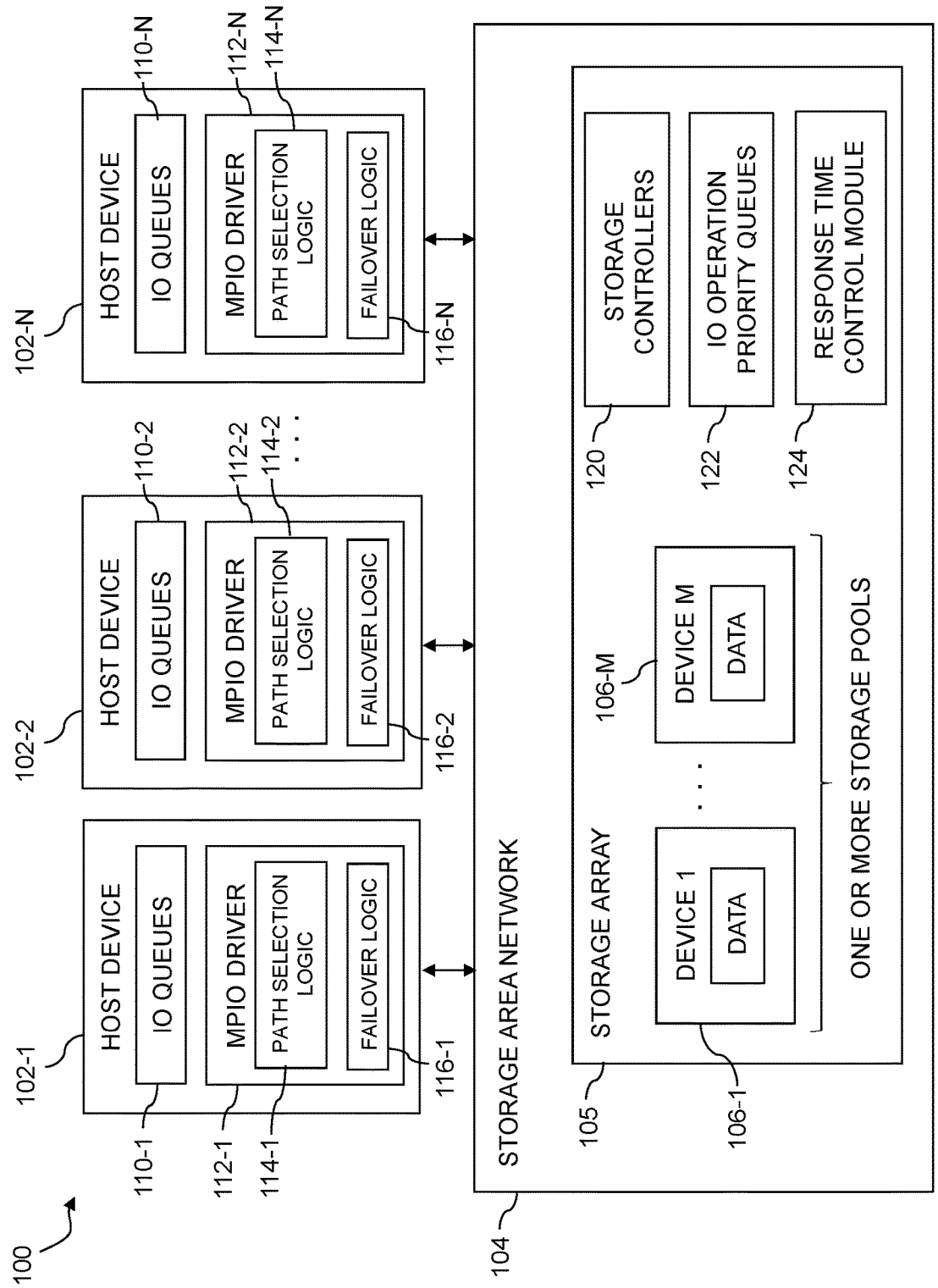
FIG. 1 is a block diagram of an information processing system configured with functionality for providing failure policies that implement HBA virtualization aware multi-pathing decisions in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality to execute failure policies that implement HBA virtualization aware multi-pathing decisions. Such functionality is provided at least in part using respective instances of path selection logic 114-1, 114-2, . . . 114-N implemented within the MPIO drivers 112. The MPIO drivers 112 further comprises respective instances of failover logic 116-1, 116-2, . . . 116-N implemented within the MPIO drivers 112. The failover logic 116 may be implemented as part of the MPIO drivers 112 of the respective host devices 102 or separate from the MPIO drivers 112.

The MPIO drivers 112 may comprise, for example, otherwise conventional MPIO drivers, such as PowerPath® drivers from Dell EMC, suitably modified in the manner disclosed herein to provide functionality to execute failure policies that implement HBA virtualization aware multi-pathing decisions. Other types of MPIO drivers from other driver vendors may be suitably modified to incorporate functionality to execute failure policies that implement HBA virtualization aware multi-pathing decisions as disclosed herein.

The term "MPIO driver" as used herein is intended to be broadly construed, and such a component is illustratively implemented at least in part as a combination of software and hardware. For example, MPIO driver 112-1 can comprise one or more software programs running on a hardware processor of host device 102-1.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

The paths from the host device 102-1 to the storage array 105 illustratively comprise paths associated with respective initiator-target pairs, with each initiator comprising an HBA or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

As described in more detail herein, an HBA can be a virtual HBA. According to an embodiment, each virtual HBA is a virtual instance of a corresponding physical HBA of a physical host device. The virtual HBA may be a component of a virtual host device. According to an embodiment, N-port ID virtualization (NPIV) is used to enable sharing of a single physical Fibre Channel HBA port among multiple virtual ports, where each virtual port and the physical HBA port have unique identifiers. In an embodiment, each virtual HBA is identified by one or more worldwide names (WWNs) assigned by a management server. For example, each virtual HBA is identified by a pair of WWNs comprising a world-wide port name (WWPN) and a worldwide node name (WWNN). In one or more embodiments, physical HBAs on an ESXi operating system host device have access to a LUN though their WWNs in order for the virtual machines on that host device to have access to that LUN using their NPIV WWNs. The physical HBAs on the ESXi host device support NPIV.

In an example embodiment, each virtual machine includes up to 4 virtual HBAs. NPIV-enabled virtual machines with, for example, 4 virtual HBAs, are assigned 4 NPIV-related WWNs, which are used to communicate with physical HBAs through virtual ports. If there is one-to-one correspondence between virtual and physical HBAs, virtual machines will use, for example, 4 physical HBAs (one for each virtual HBA) for NPIV purposes. In other arrangements, a single physical HBA may correspond to multiple virtual HBAs. For example, in the case of 4 virtual HBAs, the first two virtual HBAs may correspond to (e.g., be virtual instances of) a first physical HBA, and the second two virtual HBAs may correspond to (e.g., be virtual instances of) a second physical HBA. It is to be understood that the arrangements and correspondences between the physical and virtual HBAs are not limited to the embodiments above, and other arrangements and correspondences between physical and virtual HBAs are contemplated.

In some embodiments, the paths are associated with respective communication links between the host device 102-1 and the storage array 105 with each such communication link having a negotiated link speed. For example, in conjunction with registration of a given HBA (physical and/or virtual) to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective physical HBAs of the host device 102-1 or virtual instances of the respective physical HBAs, and that the targets of the plurality of initiator-target pairs comprise respective ports of the storage array 105. Examples of such physical HBAs, virtual HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

As is apparent from the foregoing, MPIO driver 112-1 of host device 102-1 is configured to control delivery of IO operations from the host device 102-1 to the storage array 105 over selected paths through the SAN 104.

The MPIO driver 112-1 is further configured with failover logic 116-1 to execute failure policies that implement HBA virtualization aware multi-pathing decisions. The embodiments utilize an HBA virtualization aware MPIO driver 112-1, which identifies details of virtual HBA(s) and their respective backing physical HBA(s), so that the failover logic 116-1 can differentiate between various virtual HBA path(s) when making multi-pathing decisions in response to failed IO operations.

According to one or more embodiments, when configuring an MPIO driver 112-1, a multi-path layer learns about a target port hierarchy for a connected storage array 105 that it supports by parsing standard and/or vendor specific commands and storing such path specific information in its kernel data-structure. The port information assists with the derivation of distinct unique paths to the storage array 105, enabling the MPIO driver 112-1, and more specifically, the path selection logic 114-1 and the failover logic 116-1, to comprehend which paths for a given LUN belong to which storage hierarchical elements, and make path selection and failure decisions based on the port information. Existing failover policies identify the most uncommon path for IO operation retry in an effort to provide the best chance of success for the retried IO operation. The most uncommon path is from a different initiator connected to a different storage target than the current path on which the IO operation failed.

However, current failure/retry techniques do not account for whether provisioned virtual HBA instances are backed by (e.g., correspond to) the same or different physical HBAs. The MPIO driver 112-1 identifies whether provisioned HBAs are physical or virtual HBAs. The host device 102-1 comprises advanced virtualization capabilities across VMs and logical partitions (LPARs), which creates multiple virtual HBA instances out of one or more physical HBAs. In an embodiment, the host device 102-1 includes, for example, a hardware management console (HMC) (see element 408 in FIG. 4 explained further herein), which creates and maintains physical to virtual HBA mapping information and assigns virtual HBAs to VMs and LPARs. In some embodiments, the HMC may be part of the MPIO driver 112-1, or part of a hypervisor running on the host device 102-1. The VMs and LPARs interact with the HMC to fetch the mapping and derived physical HBA details for the virtual HBAs mapped to the physical HBAs. The physical and virtual HBA details comprise, for example, WWN identifiers, location codes, physical HBA serial numbers, LPAR and VM identifiers and/or names, and corresponding HMC Internet Protocol (IP) addresses and/or names.

As used herein, the term "logical partition" or "LPAR" is to be broadly construed to encompass a logical segmentation of a computer's hardware resources virtualized as a separate computer running its own copy of an operating system and associated application of the operating system. For example, a VM having its own operating system and one or more applications may run in an LPAR.

Additional examples of failover logic 116-1 to execute failure policies that implement HBA virtualization aware multi-pathing decisions, as well as virtual and physical HBA arrangements are described below in conjunction with the embodiments of FIGS. 2 through 4.

Figure 4:
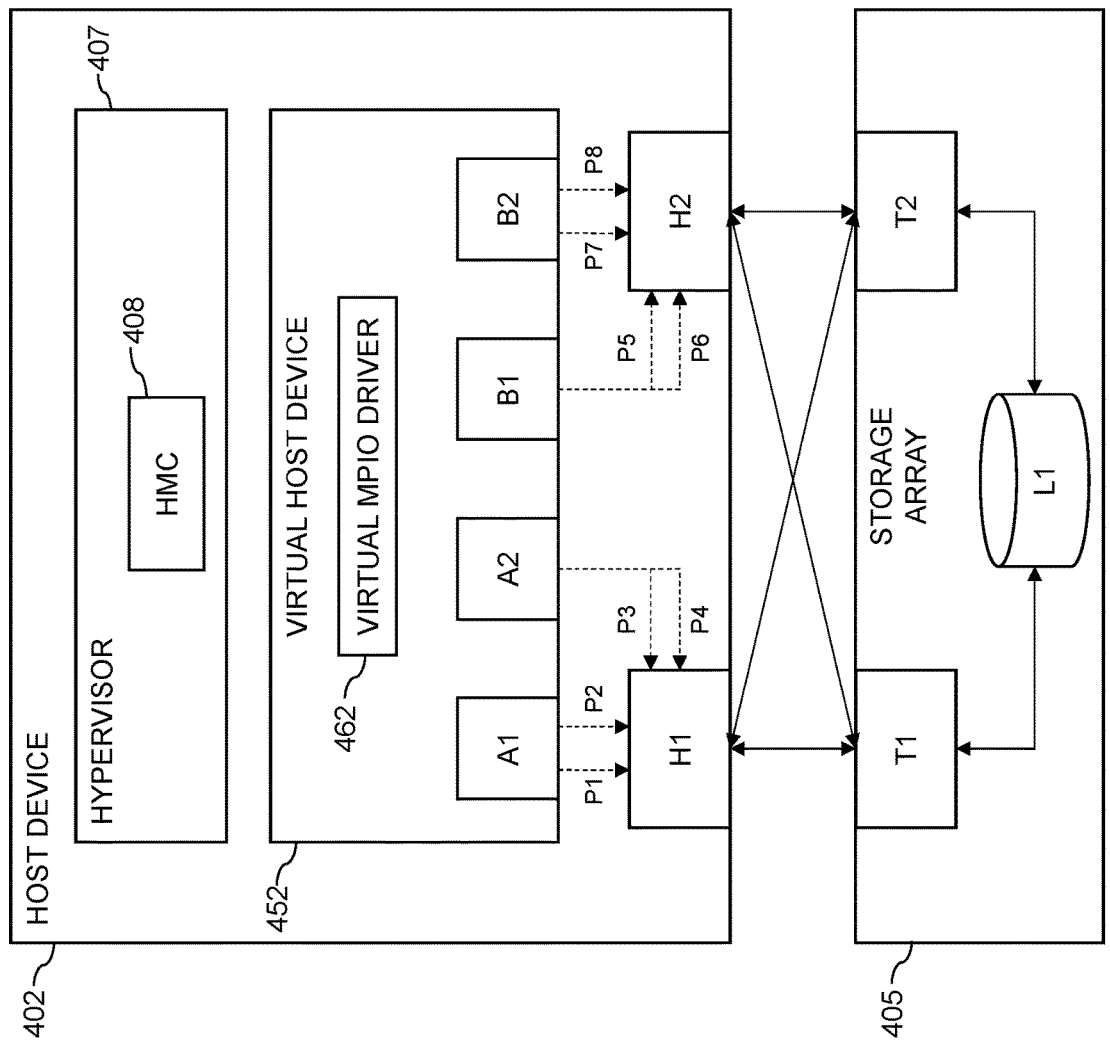
FIG. 4 shows an example of per-path performance information maintained by a host device for use in providing dynamic control of one or more path selection algorithms in an illustrative embodiment.

In an illustrative example, referring to FIG. 4, a host device 402 includes a hypervisor 407 running on the host device 402. An HMC 408 is executed on an operating system of the hypervisor 407. The hypervisor 407 controls at least one virtual host device 452 (e.g., VM) running in an LPAR of the host device 402. More than one similarly situated virtual host devices under control of the hypervisor 407 may be running in different LPARs of the host device 402. The virtual host device 452 includes a virtual MPIO driver 462, and virtual HBA instances A1, A2, B1 and B2. Virtual HBAs A1 and A2 correspond to a physical HBA H1 of the host device 402, and virtual HBAs B1 and B2 correspond to a physical HBA H2 of the host device 402. The virtual HBAs A1, A2, B1 and B2 are mapped through a plurality of paths P1, P2, P3, P4, P5, P6, P7 and P8 to a partition L1 in a LUN or other logical storage device of a storage array 405. Paths for IO operations initiated by the host device 402 to targets T1 and T2 (e.g., ports) of the storage array 405 may be provisioned through the virtual HBAs A1, A2, B1 and B2 to the partition L1. In the operational example of FIG. 4, the host device 402 has 8 paths (P1, P2, P3, . . . , P8), two via each virtual HBA, such that paths P1 and P2 are through virtual HBA A1, paths P3 and P4 are through virtual HBA A2, paths P5 and P6 are through virtual HBA B1 and paths P7 and P8 are through virtual HBA B2. Other paths to L1 or to other LUN partitions may exist, such as, for example, paths which do not go through virtual HBA instances, and only go through physical HBAs, or paths which go through virtual HBA instances of another virtual host device and through the physical HBAs H1 and H2 or different physical HBAs of the host device 402. Paths to L1 and/or other LUN partitions may also originate from other host devices and go through virtual and/or physical HBAs associated with the other host devices.

In the operational example of FIG. 4, an IO operation initiated by the host device 402 is dispatched by an MPIO driver of the host device 402 (e.g., an MPIO driver similar to one of the MPIO drivers 112 in FIG. 1) and virtual MPIO driver 462 on path P1 through virtual HBA A1, which corresponds to physical HBA H1. Using conventional techniques, where there is no awareness by the MPIO driver of HBA virtualization configurations, if the IO operation fails, the MPIO driver of the host device 402 may select the most uncommon path in a storage hierarchy to retry the failed IO operation. For example, the MPIO driver may select either path P3 or path P4 through virtual HBA A2, which is backed by the same physical HBA H1 as virtual HBA A1. If the IO operation failed due to a problem with the physical HBA H1, a re-tried IO operation on either path P3 or P4 would also fail. The IO operation may be further delayed if programmed multi-pathing rules require multiple retries of an IO operation by an MPIO driver before concluding a failure of the IO operation.

In accordance with the embodiments, the path selection logic and failover logic of the MPIO driver of the host device 402 (e.g., path selection logic and failover logic similar to logic 114 and 116 in FIG. 1) is aware of the virtual to physical HBA mapping (i.e., virtual HBAs A1 and A2 corresponding to physical HBA H1, and virtual HBAs B1 and B2 corresponding to physical HBA H2). The MPIO driver of the host device 402 processes the virtual to physical HBA path hierarchical (structure) information so that paths to LUNs through virtual HBA instances can be categorized and differentiated based on coming from different physical HBAs. According to one or more embodiments, in the event of an IO operation failure, the path selection and failover logic for retrying an operation will use the path hierarchical information to select optimal uncommon paths associated with virtual HBAs provisioned from different physical HBAs. For instance, referring to the operational example described herein above, responsive to a failure of the path P1 (virtual HBA A1, backed by physical HBA H1) the path selection and failover logic will select a path for retrying an IO operation through a different physical HBA H2 instead of the same physical HBA H1. More specifically, the path selection and failover logic will consider paths P5 and P6 corresponding to virtual HBA B1, backed by physical HBA H2, and paths P7 and P8 corresponding to virtual HBA B2, also backed by physical HBA H2, but will not consider paths P3 and P4 corresponding to virtual HBA A2, backed by physical HBA H1.

Referring back to FIG. 1, an MPIO driver 112-1 including the path selection logic 114-1 and failover logic 116-1 identifies whether there are virtual HBA instances associated with a plurality of paths to storage devices 106 of a storage array 105, and identifies the physical HBAs corresponding to respective ones of the virtual HBA instances. The MPIO driver 112-1 detects a failure of an IO operation over a first path, and the failover logic 116-1 in combination with the path selection logic 114-1 selects a second path for retrying the IO operation based on the identified physical HBAs corresponding to the respective ones of the virtual HBA instances. More specifically, the MPIO driver 112-1 selects as the second path a path through a different physical HBA than the first path. The second path uses a different virtual HBA than the first path. The different virtual HBA corresponds to the different physical HBA than a virtual HBA of the first path.

According to one or more embodiments, the MPIO driver 112-1 collects data for identifying and/or distinguishing between the virtual and physical HBAs from one or more LPARs of the host device 102-1. As noted herein, a virtual host device comprising the virtual instances of the HBAs runs on each of the one or more LPARs. The data identifying and/or distinguishing between the virtual and physical HBAs may also be retrieved from an HMC on a hypervisor running on the host device 102-1 (e.g., hypervisor 407 and HMC 408). The data identifying and/or distinguishing between the virtual and physical HBAs comprises, for example WWNs and/or location codes corresponding to the virtual and physical HBAs, respectively, identifying information of the host device 102-1 (e.g., host device serial number), identifying information of the one or more LPARs (e.g., LPAR ID and/or name), and HMC IP address and/or name.

The MPIO driver 112-1 is also configured to collect data mapping the virtual HBAs to the physical HBAs from one or more LPARs and/or an HMC of the host device 102-1. Based on the collected data, the MPIO driver 112-1 categorizes a plurality of paths for delivery of IO operations from the host device 102-1 to the storage array 105 according to the physical HBAs corresponding to the virtual HBA instances. In selecting the second path for retrying the failed IO operation, the MPIO driver 112-1 selects as the second path a path categorized under a different one of the physical HBAs than the first path.

In an example embodiment, a virtual IO server shares IO operation resources including, for example, HBAs, and allows creation of a predetermined number of virtual HBA instances out of a single physical HBA. The created virtual HBAs are assigned to multiple LPARs. An LPAR interacts with an HMC to identify physical to virtual HBA assignments and the virtual HBAs that have been allotted to the LPAR. For an LPAR, depending on the operating system, certain commands are used to differentiate between physical and virtual HBAs and facilitate WWN and location-code identification for HBAs. Other commands are used for identifying physical HBA serial numbers, and for identifying HMC details. An LPAR interacting with an HMC can iterate through physical HBA serial numbers to identify physical to virtual HBA mappings.

In a non-limiting example, in a virtualization ecosystem of an AIX operating system, a virtual IO server allows creation of a maximum of 32 virtual HBA instances from a single physical HBA. In an LPAR, "lscfg" and "lsdev" commands are used to differentiate physical and virtual HBAs, and identify WWNs and location codes for the virtual and physical HBAs. A "prtconf" command identifies physical host device and/or physical HBA serial numbers, and an "lsrsrc" command is used to identify HMC details, such as, for example, IP addresses and/or names. A command, such as, for example, "lshwres" for iterating through physical serial numbers, used in combination with commands such as, for example, "viosvrcmd" and "lsmap," when applied to an HMC and/or an LPAR, are utilized to identify physical to virtual HBA mapping. Different utilities and commands may be used depending on the operating system/virtualization ecosystem.

According to an embodiment, once LPARs and/or virtual host devices (e.g., VMs) are equipped with such parsed details identifying and/or distinguishing between the virtual and physical HBAs, the MPIO driver 112-1 adds the path hierarchical (structure) information to its path specific datastructure so that paths through different virtual HBAs can be categorized and differentiated based on coming from different physical HBAs.

In the FIG. 1 embodiment, the storage array 105 comprises a plurality of storage controllers 120, IO operation priority queues 122 and response time control module 124. The response time control module 124 may be used to implement storage array-based adjustments in response time for particular IO operations based at least in part on service level objective (SLO) information stored by the storage array 105 in its persistent memory. The response time control module 124 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105. Process tags may be used in assigning different ones of the IO operations to different ones of the IO operation priority queues 122, as disclosed in U.S. Pat. No. 10,474,367, issued Nov. 12, 2019 and entitled "Storage System with Input-Output Performance Control Utilizing Application Process Detection," which is incorporated by reference herein.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

Information can be obtained by the host device 102-1 from the storage array 105, or information can be obtained by the storage array 105 from the host device 102-1 utilizing an in-band communication mechanism in which one or more predetermined commands in a designated storage protocol are sent from the host device 102-1 to the storage array 105 or vice versa. As noted herein above, such predetermined commands can comprise, for example, log sense and log select commands, a mode sense command, a VU command, or combinations of multiple instances of these or other commands, in an otherwise standardized command format, such as a SCSI format or other type of format.

Additionally or alternatively, information can be obtained by the host device 102-1 from the storage array 105, or information can be obtained by the storage array 105 from the host device 102-1 utilizing an out-of-band communication mechanism. For example, an out-of-band communication mechanism of this type can involve host management software of the host device 102-1 communicating with storage array management software of the storage array 105 over an IP network connection or other type of network connection.

These and other functions related to executing failure policies that implement HBA virtualization aware multi-pathing decisions that are referred to herein as being performed by or under the control of the MPIO driver 112-1 can in some embodiments be performed at least in part outside of the MPIO driver 112-1, such as in the host device 102-1 generally.

References herein to an MPIO driver such as MPIO driver 112-1 being configured to execute failure policies that implement HBA virtualization aware multi-pathing decisions are intended to be broadly construed, and should not be viewed as being limited to any particular storage arrangement, such as storage in a particular host device component or using a particular format. Accordingly, such storage can be in a memory or other storage device that is outside of the MPIO driver.

As indicated previously, absent use of the techniques for executing failure policies that implement HBA virtualization aware multi-pathing decisions as disclosed herein, retry paths proceed through the same problematic physical HBAs, leading to multiple failed retried IO operations.

Conventional host device multi-pathing arrangements implement failure policies to route failed application IO operations to available paths through various HBA ports which are unaware of and not aligned with HBA virtualization arrangements. For example, current failure policies fail to take into account whether provisioned virtual instances of HBAs to host devices are backed by the same or different physical HBAs. As a result, current failure algorithms select non-optimal retry paths through the same failed physical HBAs, resulting in less-effective multi-pathing policies.

Such drawbacks are advantageously overcome in illustrative embodiments herein by utilization of a multi-path layer comprising one or more of the MPIO drivers 112 to identify details of virtual HBA(s) and their respective backing physical HBA(s) in order to provide failure policies that implement HBA virtualization aware multi-pathing decisions that are aligned with HBA virtualization arrangements. Unlike current techniques, the embodiments consider path hierarchical details of HBA virtualization configurations when selecting paths in the event of a failure of one or more IO operations. Accordingly, the illustrative embodiments are much more efficient and effective than conventional approaches that are unaware of physical and virtual HBA arrangements.

The above-described functions associated with the execution of failure policies that implement HBA virtualization aware multi-pathing decisions in the MPIO driver 112-1 are carried out at least in part under the control of its path selection logic 114-1 and failover logic 116-1. For example, the path selection logic 114-1 and failover logic 116-1 are illustratively configured to control performance of an algorithm comprising the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for executing failure policies that implement HBA virtualization aware multi-pathing decisions.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in "Dell EMC SC Series Storage and Microsoft Multipath I/O," Dell EMC, CML 1004, July 2018, which is incorporated by reference herein. Such conventional MPIO functionality is suitably modified in illustrative embodiments disclosed herein to support execution of failure policies that implement HBA virtualization aware multi-pathing decisions.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of path selection logic 114 and failover logic 116 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 206, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
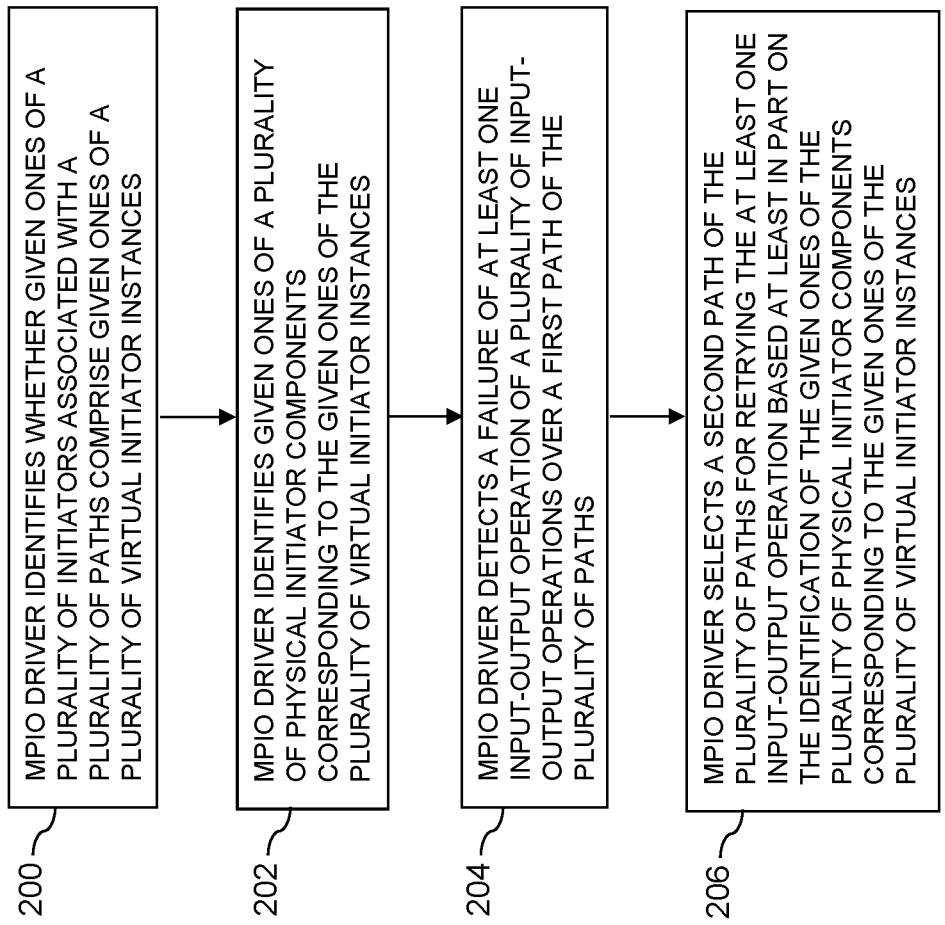
FIG. 2 is a flow diagram of a process for providing failure policies that implement HBA virtualization aware multi-pathing decisions in an illustrative embodiment.

The steps of the FIG. 2 process are illustratively performed at least in part by or under the control of an MPIO driver of a given host device. For example, portions of the process may be carried out under the control of software, firmware and/or hardware of an instance of path selection logic and/or failover logic deployed within the MPIO driver. Accordingly, the FIG. 2 process may be viewed as an example of an algorithm performed by the path selection logic 114-1 and/or failover logic 116-1 of the MPIO driver 112-1 of host device 102-1. Other arrangements of host device components and/or other system components can be configured to perform at least portions of one or more of the steps in other embodiments.

In step 200, an MPIO driver, which is configured to control delivery of a plurality of IO operations from a host device to a storage system over selected ones of a plurality of paths through a network, identifies whether given ones of a plurality of initiators associated with the plurality of paths comprise given ones of a plurality of virtual initiator instances. In step 202, the MPIO driver identifies given ones of a plurality of physical initiator components corresponding to the given ones of the plurality of virtual initiator instances. According to an embodiment, the plurality of virtual initiator instances comprise respective ones of a plurality of virtual HBAs, and the plurality of physical initiator components comprise respective ones of a plurality of physical HBAs.

In step 204, a failure of at least one IO operation of the plurality of input-output operations over a first path of the plurality of paths is detected by the MPIO driver and, in step 206, a second path of the plurality of paths for retrying the at least one IO operation is selected by the MPIO driver. The selection of the second path is based at least in part on the identification of the given ones of the plurality of physical initiator components corresponding to the given ones of the plurality of virtual initiator instances.

Multiple additional instances of the FIG. 2 process may be performed in respective additional host devices that share the storage array. Other embodiments can include multiple storage arrays, with the disclosed functionality for dynamic control of one or more path selection algorithms being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for dynamic control of one or more path selection algorithms. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of dynamic control arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
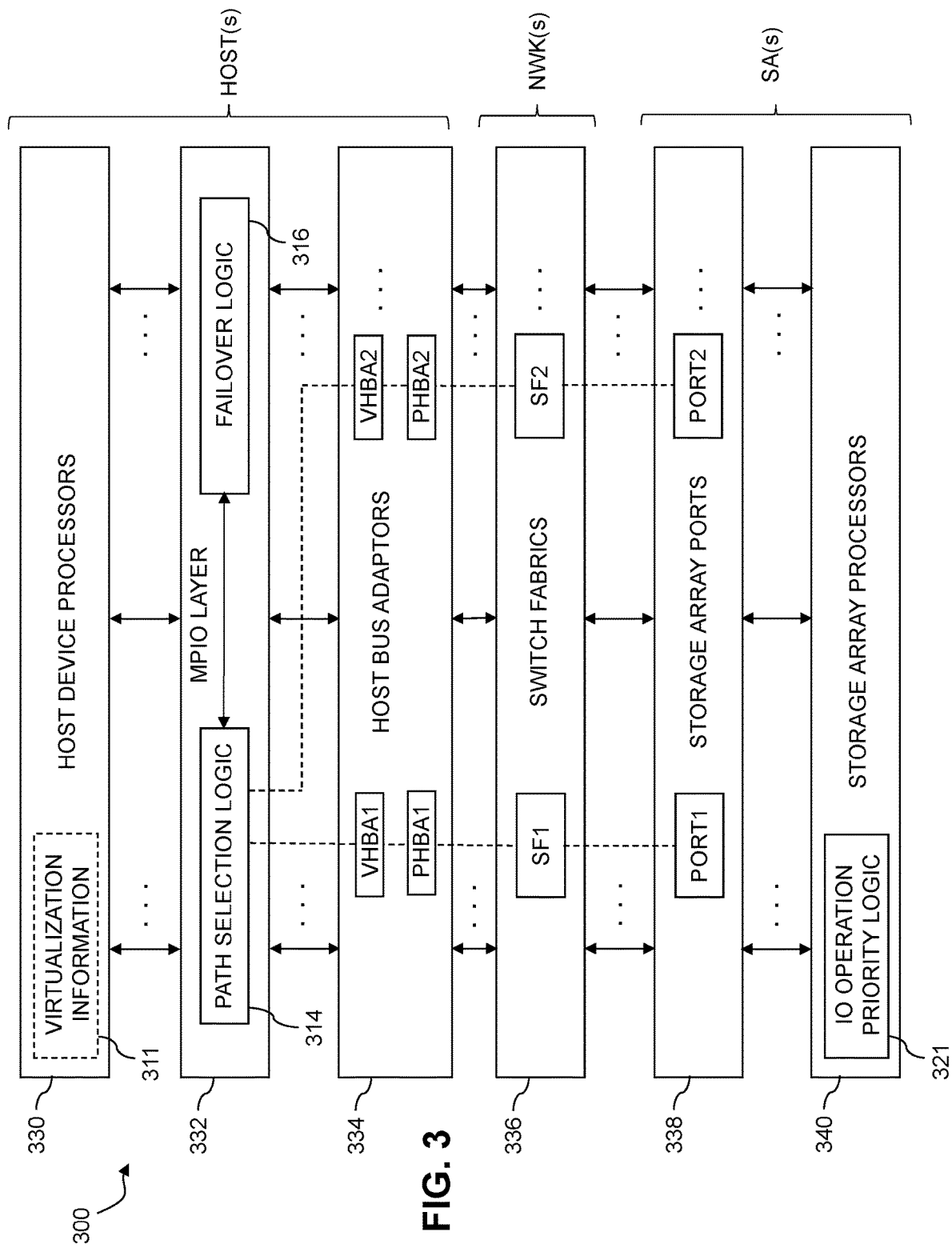
FIG. 3 is a block diagram showing multiple layers of a layered system architecture that includes a multi-path layer with functionality for providing failure policies that implement HBA virtualization aware multi-pathing decisions in an illustrative embodiment.

Referring now to FIG. 3, another illustrative embodiment is shown. In this embodiment, an information processing system 300 comprises one or more instances of virtualization information 311, path selection logic 314, failover logic 316 and IO operation priority logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment executes failure policies that implement HBA virtualization aware multi-pathing decisions based on stored virtualization information 311. The virtualization information 311 is illustratively shown as part of one or more host device processors of the host device processor layer 330. Other virtualization information storage arrangements are possible, and the virtualization information 311 is therefore shown in dashed outline in the figure. For example, the virtualization information 311 in other embodiments is illustratively stored entirely in the MPIO layer 332. It is therefore possible in some embodiments that the virtualization information 311 can be stored utilizing a component of the MPIO layer 332, such as within a data structure of the path selection logic 314 or failover logic 316. The virtualization information 311 illustratively comprises data identifying and/or distinguishing between the virtual and physical HBAs in the manner disclosed herein. For example, the virtualization information 311 illustratively comprises data mapping the virtual HBAs to the physical HBAs.

The MPIO layer 332 is an example of what is also referred to herein as a multi-path layer, and comprises one or more MPIO drivers implemented in respective host devices. Each such MPIO driver illustratively comprises an instance of path selection logic 314 and an instance of failover logic 316 configured to implement functionality for executing failure policies that implement HBA virtualization aware multi-pathing decisions substantially as previously described. Additional or alternative layers and path selection and failover logic arrangements can be used in other embodiments.

The IO operation priority logic 321 implemented in the storage array processor layer 340 controls different levels of performance for IO operations. For example, the IO operation priority logic 321 provides different priority levels for different ones of the IO operations by assigning different ones of the IO operations to different IO operation priority queues. It is also possible in some embodiments that the IO operation priority logic 321 can include multiple distinct IO operation priority logic instances for multiple IO queues of respective ones of a plurality of host devices of the system 300.

In the system 300, path selection logic 314, in combination with the failover logic 316, is configured to select different paths for sending IO operations from a given host device to a storage array. These paths as illustrated in the figure include a first path from a particular virtual HBA denoted VHBA1, through a particular physical HBA denoted PHBA1, through a particular switch fabric denoted SF1 to a particular storage array port denoted PORT1, and a second path from another particular virtual HBA denoted VHBA2, through another particular physical HBA denoted PHBA2, through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of virtual and physical HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 in combination with the failover logic 316 of the MPIO layer 332 in this embodiment therefore selects paths for delivery of IO operations to the one or more storage arrays having the storage array ports of the storage array port layer 338. In selecting the paths, the path selection logic 314 in combination with the failover logic 316 utilizes a particular path selection algorithm that is dynamically activated based at least in part on data identifying and/or distinguishing between the virtual and physical HBAs including, for example, data mapping the virtual HBAs to the physical HBAs.

It is assumed in this embodiment that the host devices through their respective MPIO drivers and respective instances of path selection logic 314 and failover logic 316 provide functionality for executing failure policies that implement HBA virtualization aware multi-pathing decisions, possibly with involvement of other host device components.

Accordingly, the path selection logic 314 and the failover logic 316 utilize the virtualization information 311 in determining appropriate paths over which to send particular IO operations to ports of one or more storage arrays. As described elsewhere herein, such execution of failure policies that implement HBA virtualization aware multi-pathing decisions can substantially improve system performance.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of physical HBAs to accommodate predicted performance needs. In some cases, the number of physical HBAs per host device is on the order of 4, 8 or 16 physical HBAs, although other numbers of physical HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The virtual and physical HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

The particular features and functionality of the illustrative embodiments described above can be varied in other embodiments. For example, the particular conditions and failover algorithm types mentioned above can be altered to accommodate the particular needs of a given implementation. In addition, various parameters of a given failover algorithm, such as its particular thresholds, distribution mechanisms, timing arrangements and other parameters, can be dynamically adjusted based on physical and virtual HBA arrangements or other virtualization information determined as disclosed herein.

Also, as mentioned previously, different instances of the above-described processes and other techniques for executing failure policies that implement HBA virtualization aware multi-pathing decisions can be performed by different MPIO drivers in different host devices.

The particular failover arrangements described above are therefore presented by way of illustrative example only. Numerous alternative arrangements of these and other features can be used in executing failure policies that implement HBA virtualization aware multi-pathing decisions in other illustrative embodiments.

The illustrative embodiments disclosed herein can provide a number of significant advantages relative to conventional arrangements. For example, the embodiments configure a multi-path layer of one or more host devices to include functionality for executing failure policies that implement HBA virtualization aware multi-pathing decisions, which account for whether provisioned virtual instance of HBAs are backed by same or different physical HBAs. For example, the virtualization failover policies select paths to retry a failed IO operation which are through different virtual HBAs and different physical HBAs than previous paths. As a result, given a situation where a previous IO operation failed due to a problem with a given physical HBA tied to a given virtual HBA, the selection of the new path is based on knowledge of which physical HBAs are tied to the virtual HBAs, so that the new path uses another virtual HBA that is not tied to the malfunctioning physical HBA.

These and other arrangements are advantageously configured to implement virtualization configuration-aware failover policies that avoid selection of retry paths backed by the same failed physical HBAs, leading to higher efficiency and faster processing of IO operations between host devices and storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and failover logic 116 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, failover logic and additional or alternative components. Also, the particular configurations of system and device elements and associated processing operations illustratively shown in the drawings can be varied in other embodiments. For example, a wide variety of different MPIO driver configurations and associated arrangements for executing failure policies that implement HBA virtualization aware multi-pathing decisions can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device comprising a processor coupled to a memory;
the host device being configured to communicate over a network with a storage system;
the host device comprising:
a multi-path input-output driver configured to control delivery of a plurality of input-output operations from the host device to the storage system over selected ones of a plurality of paths through the network;
wherein the multi-path input-output driver is further configured:
to identify whether given ones of a plurality of initiators associated with the plurality of paths comprise given ones of a plurality of virtual initiator instances;
to identify given ones of a plurality of physical initiator components corresponding to the given ones of the plurality of virtual initiator instances;
wherein, in identifying given ones of the plurality of physical initiator components corresponding to the given ones of the plurality of virtual initiator instances, the multi-path input-output driver is configured to access data mapping sets of two or more virtual initiator instances of the plurality of virtual initiator instances to respective single physical initiator components of the plurality of physical initiator components;
to detect a failure of at least one input-output operation of the plurality of input-output operations over a first path of the plurality of paths, wherein the first path is through a first virtual initiator instance of the plurality of virtual initiator instances mapped to a first physical initiator component of the plurality of physical initiator components;
to identify a second path of the plurality of paths that is through a second virtual initiator instance of the plurality of virtual initiator instances mapped to a second physical initiator component of the plurality of physical initiator components different from the first physical initiator component; and
to select the second path of the plurality of paths for retrying the at least one input-output operation;
wherein the identification and selection of the second path is based at least in part on the data mapping the sets of two or more virtual initiator instances of the plurality of virtual initiator instances to the respective single physical initiator components of the plurality of physical initiator components.

2. The apparatus of claim 1 wherein the plurality of virtual initiator instances comprise respective ones of a plurality of virtual host bus adaptors.

3. The apparatus of claim 2 wherein the plurality of physical initiator components comprise respective ones of a plurality of physical host bus adaptors.

4. The apparatus of claim 3 wherein, in selecting the second path of the plurality of paths for retrying the at least one input-output operation, the multi-path input-output driver is configured to select as the second path a path of the plurality of paths associated with a different one of the plurality of physical host bus adaptors than the first path.

5. The apparatus of claim 3 wherein:
in selecting the second path of the plurality of paths for retrying the at least one input-output operation, the multi-path input-output driver is configured to select as the second path a path of the plurality of paths associated with a different virtual host bus adaptor of the plurality virtual host bus adaptors than the first path; and the different virtual host bus adaptor corresponds to a different physical host bus adaptor of the plurality of physical host bus adaptors than a virtual host bus adaptor of the first path.

6. The apparatus of claim 1 wherein, in identifying whether the given ones of the plurality of initiators comprise given ones of the plurality of virtual initiator instances, the multi-path input-output driver is configured to access data for distinguishing between the virtual and physical initiator components from one or more logical partitions of the host device.

7. The apparatus of claim 6 wherein the data comprises world-wide names corresponding to the given ones of the plurality of virtual initiator instances and to the given ones of the plurality of physical initiator components.

8. The apparatus of claim 6 wherein the data comprises at least one of identifying information of the host device and identifying information of the one or more logical partitions of the host device.

9. The apparatus of claim 1 wherein the data mapping the sets of two or more virtual initiator instances of the plurality of virtual initiator instances to the respective single physical initiator components of the plurality of physical initiator components is accessed from one or more logical partitions of the host device.

10. The apparatus of claim 9 wherein the multi-path input-output driver is further configured to categorize the plurality of paths according to respective single physical initiator components of the plurality of physical initiator components corresponding to the sets of two or more virtual initiator instances of the plurality of virtual initiator instances.

11. The apparatus of claim 10 wherein the first path of the plurality of paths is categorized under the first physical initiator component and the second path of the plurality of paths is categorized under the second physical initiator components.

12. The apparatus of claim 1 wherein the second virtual initiator instance of the plurality virtual initiator instances is different from the first virtual initiator instance of the plurality virtual initiator instances.

13. A method performed by a host device configured to communicate over a network with a storage system, comprising:
configuring a multi-path input-output driver of the host device to control delivery of input-output operations from the host device over selected ones of a plurality of paths through the network;
the multi-path input-output driver:
identifying whether given ones of a plurality of initiators associated with the plurality of paths comprise given ones of a plurality of virtual initiator instances;
identifying given ones of a plurality of physical initiator components corresponding to the given ones of the plurality of virtual initiator instances;
wherein identifying given ones of the plurality of physical initiator components corresponding to the given ones of the plurality of virtual initiator instances comprises accessing data mapping sets of two or more virtual initiator instances of the plurality of virtual initiator instances to respective single physical initiator components of the plurality of physical initiator components;
detecting a failure of at least one input-output operation of the plurality of input-output operations over a first path of the plurality of paths, wherein the first path is through a first virtual initiator instance of the plurality of virtual initiator instances mapped to a first physical initiator component of the plurality of physical initiator components;
identifying a second path of the plurality of paths that is through a second virtual initiator instance of the plurality of virtual initiator instances mapped to a second physical initiator component of the plurality of physical initiator components different from the first physical initiator component; and
selecting the second path of the plurality of paths for retrying the at least one input-output operation;
wherein the identification and selection of the second path is based at least in part on the of data mapping the sets of two or more virtual initiator instances of the plurality of virtual initiator instances to the respective single physical initiator components of the plurality of physical initiator components; and
wherein the host device comprises a processor coupled to a memory.

14. The method of claim 13 wherein the plurality of virtual initiator instances comprise respective ones of a plurality of virtual host bus adaptors.

15. The method of claim 14 wherein the plurality of physical initiator components comprise respective ones of a plurality of physical host bus adaptors.

16. The method of claim 15 wherein the selecting of the second path of the plurality of paths for retrying the at least one input-output operation comprises selecting as the second path a path of the plurality of paths associated with a different one of the plurality of physical host bus adaptors than the first path.

17. A computer program product comprising a non-transitory processor-readable storage medium having stored therein program code of one or more software programs, wherein the program code, when executed by a host device comprising a multi-path input-output driver, the host device being configured to communicate over a network with a storage system, causes the multi-path input-output driver:
to control delivery of input-output operations from the host device to the storage system over selected ones of a plurality of paths through the network;
to identify whether given ones of a plurality of initiators associated with the plurality of paths comprise given ones of a plurality of virtual initiator instances;
to identify given ones of a plurality of physical initiator components corresponding to the given ones of the plurality of virtual initiator instances;
wherein, in identifying given ones of the plurality of physical initiator components corresponding to the given ones of the plurality of virtual initiator instances, the program code causes the multi-path input-output driver to access data mapping sets of two or more virtual initiator instances of the plurality of virtual initiator instances to respective single physical initiator components of the plurality of physical initiator components;
to detect a failure of at least one input-output operation of the plurality of input-output operations over a first path of the plurality of paths, wherein the first path is through a first virtual initiator instance of the plurality of virtual initiator instances mapped to a first physical initiator component of the plurality of physical initiator components;
to identify a second path of the plurality of paths that is through a second virtual initiator instance of the plurality of virtual initiator instances mapped to a second physical initiator component of the plurality of physical initiator components different from the first physical initiator component; and to select the second path of the plurality of paths for retrying the at least one input-output operation;

wherein the identification and selection of the second path is based at least in part on the data mapping the sets of two or more virtual initiator instances of the plurality of virtual initiator instances to the respective single physical initiator components of the plurality of physical initiator components.

18. The computer program product of claim 17 wherein the second virtual initiator instance of the plurality virtual initiator instances is different from the first virtual initiator instance of the plurality virtual initiator instances.

19. The computer program product of claim 17 wherein the data mapping the sets of two or more virtual initiator instances of the plurality of virtual initiator instances to the respective single physical initiator components of the plurality of physical initiator components is accessed from one or more logical partitions of the host device.

20. The method of claim 13 wherein the data mapping the sets of two or more virtual initiator instances of the plurality of virtual initiator instances to the respective single physical initiator components of the plurality of physical initiator components is accessed from one or more logical partitions of the host device.

* * * * *